United States Patent
Kim et al.

(10) Patent No.: US 9,255,183 B2
(45) Date of Patent: Feb. 9, 2016

(54) POLYARYLENE SULFIDE HAVING REDUCED OUTGASSING AND PREPARATION METHOD THEREOF

(75) Inventors: Sung-Gi Kim, Gyeonggi-do (KR); Jae-Bong Lim, Gyeonggi-do (KR); Il-Hoon Cha, Gyeonggi-do (KR)

(73) Assignee: SK Chemicals Co., Ltd. (KR)

( * ) Notice: Subject to any disclaimer, the term of this patent is extended or adjusted under 35 U.S.C. 154(b) by 91 days.

(21) Appl. No.: 13/582,868

(22) PCT Filed: Mar. 8, 2011

(86) PCT No.: PCT/PC2011/001596
§ 371 (c)(1),
(2), (4) Date: Sep. 5, 2012

(87) PCT Pub. No.: WO2011/111983
PCT Pub. Date: Sep. 15, 2011

(65) Prior Publication Data
US 2012/0329983 A1 Dec. 27, 2012

(30) Foreign Application Priority Data

Mar. 10, 2010 (KR) .................... 10-2010-0021390

(51) Int. Cl.
| | |
|---|---|
| C08G 75/00 | (2006.01) |
| C08G 75/02 | (2006.01) |
| C08G 75/14 | (2006.01) |
| C08J 5/18 | (2006.01) |

(52) U.S. Cl.
CPC ............... *C08G 75/02* (2013.01); *C08G 75/14* (2013.01); *C08J 5/18* (2013.01); *C08J 2381/04* (2013.01)

(58) Field of Classification Search
CPC . C08G 75/14; C08G 75/0263; C08G 75/0268
USPC .................. 528/381, 389, 373, 388
See application file for complete search history.

(56) References Cited

U.S. PATENT DOCUMENTS

| | | | |
|---|---|---|---|
| 2,513,188 A | 6/1950 | Macallum | |
| 2,583,941 A | 1/1952 | Gordon, Jr. | |
| 4,786,713 A | 11/1988 | Rule | |
| 4,792,600 A | 12/1988 | Rule et al. | |
| 4,855,393 A | 8/1989 | Rule et al. | |
| 4,952,671 A * | 8/1990 | Fagerburg et al. | 528/226 |
| 8,242,233 B2 | 8/2012 | Lee et al. | |
| 2010/0022743 A1 | 1/2010 | Lee et al. | |
| 2011/0257363 A1 | 10/2011 | Shin et al. | |
| 2012/0322971 A1 | 12/2012 | Kim et al. | |

FOREIGN PATENT DOCUMENTS

| | | |
|---|---|---|
| EP | 0316078 A2 | 5/1989 |
| JP | 03-500901 A | 2/1991 |
| JP | 03-502586 A | 6/1991 |
| JP | H09286860 A | 11/1997 |
| JP | 2000319394 A | 11/2000 |
| JP | 2008202164 A | 9/2008 |
| JP | 2009270118 A | 11/2009 |
| JP | 2010-501661 A | 1/2010 |
| JP | 2010-515781 A | 5/2010 |
| JP | 2012-513492 A | 6/2012 |
| JP | 2013-522385 A | 6/2013 |
| KR | 10-2008-0018770 A | 2/2008 |
| KR | 10-2008-0064737 A | 7/2008 |

OTHER PUBLICATIONS

Flory (Principles of Polymer Chemistry), 309, 1953.*
"International Application Serial No. PCT/KR2011/001596, International Search Report mailed Nov. 28, 2011", (w/ English Translation), 7 pgs.

\* cited by examiner

*Primary Examiner* — Shane Fang
(74) *Attorney, Agent, or Firm* — Schwegman Lundberg & Woessner, P.A.

(57) ABSTRACT

Embodiments of the present invention relate to polyarylene sulfide that may exhibit excellent processability at low temperature, decrease outgassing and flash or burr generation, and thus may satisfactorily mold a product requiring high molding accuracy, and a method for preparing the same. Specifically, the polyarylene sulfide includes an arylene sulfide repeat unit and an arylene disulfide repeat unit, wherein the weight ratio of the arylene sulfide repeat unit:arylene disulfide repeat unit is 1:0.0001 to 1:0.05.

18 Claims, No Drawings

POLYARYLENE SULFIDE HAVING REDUCED OUTGASSING AND PREPARATION METHOD THEREOF

CROSS REFERENCE TO RELATED APPLICATION

This application is a nationalization under 35 U.S.C. 371 of PCT/KR2011/001596 filed Mar. 8, 2011 and published as WO 2011/111983 A1 on Sep. 15, 2011, which application claims priority to and the benefit of Korean Patent Application No. 10-2010-0021390, filed Mar. 10, 2010, which applications and publication are incorporated herein by reference in their entirety.

FIELD OF THE INVENTION

This disclosure relates to polyarylene sulfide that may exhibit excellent processability at low temperature, decrease outgassing and burr (flash) generation, and thus may satisfactorily mold a product requiring high molding accuracy, and a method for preparing the same.

BACKGROUND OF THE INVENTION

Currently, polyarylene sulfide is representative engineering plastic, and is in great demand for high temperature and corrosive environment and electronic products due to high heat resistance, chemical resistance, flame resistance, and electric insulation. The major uses include computer accessories, automobile accessories, coating of the part contacting corrosive chemical materials, and industrial chemical resistant fiber, and the like.

Presently, polyphenylene sulfide (PPS) is the only commercially available polyarylene sulfide. According to the current commercial production process of PPS, p-dichlorobenzene (pDCB) and sodium sulfide are used as raw materials and reacted in a polar organic solvent such as N-methyl pyrrolidone, and the like. This method is known as a Macallum process, and the basic process is disclosed in U.S. Pat. Nos. 2,513,188 and 2,583,941, wherein some usable polar solvents are suggested, but N-methylpyrrolidone is currently most commonly used. This process uses dichloro aromatic compounds as raw material, and sodium chloride (NaCl) is generated as a by-product.

Meanwhile, since PPS obtained in the Macallum process generally has good flowability at high temperature, it may be molded even under low pressure and has good processability. However, if products requiring high accuracy or having flat shapes such as various computer accessories or electronic products are manufactured, flash or burr may be generated in the molded product, and thus, this process has a limitation in the manufacture of precision parts. In addition, since molding should be conducted at high temperature in order to apply for precision parts and improve flowability, a large amount of the generated outgas may injure operator's health, and it may cause air pollution.

SUMMARY OF THE INVENTION

It is an object of the invention to provide polyarylene sulfide that may exhibit excellent processability at low temperature, decrease outgassing and burr generation, and thus, may satisfactorily mold a product requiring high molding accuracy.

It is another object of the invention to provide a method for preparing the polyarylene sulfide.

It is yet another object of the invention to provide a molded product, a film, a sheet or fiber manufactured by molding the polyarylene sulfide.

The present invention provides polyarylene sulfide including an arylene sulfide repeat unit and an arylene disulfide repeat unit, wherein the weight ratio of the arylene sulfide repeat unit:arylene disulfide repeat unit is 1:0.0001 to 1:0.05.

The present invention also provides a method for preparing the polyarylene sulfide, including (a) polymerization reacting reactants comprising diiodide aromatic compounds and sulfur compounds; and (b) additionally introducing 0.1 to 20 parts by weight of sulfur compounds, based on the 100 parts by weight of the sulfur compounds in the reactants, while progressing the polymerization reaction.

The present invention also provides a product manufactured by molding the polyarylene sulfide.

DETAILED DESCRIPTION OF THE INVENTION

Hereinafter, the present invention will be explained in detail.

During repeated studies on polyarylene sulfide that may exhibit excellent processability at low temperature, decrease outgassing and burr generation, and thus may satisfactorily mold a product requiring high molding accuracy, the inventors completed the invention.

As explained above, if computer accessories or electronic products, and the like requiring molding accuracy are molded with the previously known polyarylene sulfide, polyarylene sulfide having high flowability at high processing temperature may permeate the gap of a mold to generate flash or burr around the molded product. To remove the flash or burr, according to the existing method, a separate burr removing process should be conducted, which renders a molding process complicated, and faulty molding of the product may be caused due to the burr generation.

For reference, the flash or burr refers to a phenomenon that molten resin is leaked on the coating surface of a mold and the material is attached to a molded product in the form of a thin film. The flash or burr may occur according to injection conditions such as too high injection pressure, a mold having problems, and the like, and basically, it may occur when the resin has too high flowability. Herein, the flash or burr is defined as the latter case.

In addition, according to the existing method, during processing at high temperature for molding of precision parts, molding additives such as a lubricant, and the like and low-boiling point compounds contained in the polyarylene sulfide are gasified and spread in the work place, thus threatening the health of operators and contaminating air environment.

Meanwhile, the inventors confirmed that polyarylene sulfide including a certain level of arylene disulfide repeat unit, as well as arylene sulfide repeat unit, a common repeat unit of polyarylene sulfide, may be obtained according to the following method. In the polyarylene sulfide, equilibrium reactions of sulfur exchange reactions may occur between the disulfide structure of the arylene disulfide repeat unit and various polymer chains included in the polyarylene sulfide. Thus, due to the sulfur exchange reactions, the molecular weight of the polymer chains included in the polyarylene sulfide may be uniformalized, and the content of polymer chains having too large or too small molecular weights may be decreased. Namely, the molecular weight distribution of the polymer chains included in the polyarylene sulfide may become symmetric.

For this reason, as polyarylene sulfide has proper flowability and may exhibit excellent processability even at low temperature, and the content of polymer chains having too low molecular weight is decreased, overly increase in the flowability of polyarylene sulfide or flash or burr generation during molding may be reduced.

Furthermore, due to the existence of the arylene disulfide repeat unit, the melting point of the polyarylene sulfide may be lowered, and thus, the processability of the polyarylene sulfide may become more excellent. In addition, since processing temperature may be lowered during molding due to the decreased melting point of the polyarylene sulfide, outgassing may be reduced to further improve properties of the polyarylene sulfide. Thus, the polyarylene sulfide may exhibit excellent properties and processability, and simultaneously minimize flash or burr generation, and thus, it may be satisfactorily molded into products requiring molding accuracy.

The polyarylene sulfide according to one embodiment of the invention includes an arylene sulfide repeat units and an arylene disulfide repeat unit, wherein the weight ratio of the arylene sulfide repeat unit:arylene disulfide repeat unit is 1:0.0001 to 1:0.05. The polyarylene sulfide including a certain weight ratio of the arylene disulfide repeat unit to the arylene sulfide repeat unit may lower molding operation temperature due to the low melting point, and it may not generate flash or burr while exhibiting excellent processability during molding, and thus, it may be satisfactorily molded into products requiring high molding accuracy.

The arylene sulfide repeat unit may be included in the content of 95 to 99.99 wt %, based on the total weight of the polyarylene sulfide. In addition, the arylene disulfide repeat unit may be included in the content of 0.01 to 5 wt %, based on the total weight of the polyarylene sulfide.

As results of experiments, it was confirmed that the polyarylene sulfide has proper flowability and may exhibit equal or more excellent processability compared to those previously known, and simultaneously, it may enable satisfactory molding of products requiring high molding accuracy or having a flat shape without generating flash or burr during molding of polyarylene sulfide.

In addition, the polyarylene sulfide may have a number average molecular weight of 3,000 to 1,000,000, preferably 3,000 to 50,000.

Further, the polyarylene sulfide may have a relatively uniform dispersion degree of 2.0 to 4.0, preferably 2.0 to 3.5, as defined by weight average molecular weight to number average molecular weight. The polyarylene sulfide having the above number average molecular weight and/or dispersion degree may be manufactured into various products according to the molecular weight or melt viscosity.

Meanwhile, since the polyarylene sulfide according to embodiments of the invention includes a certain content of the arylene disulfide repeat unit, it may have a lower melting point compared to polyarylene sulfide consisting only of pure arylene sulfide repeat unit, and thus, processable temperature is lowered to decrease outgassing during molding, and the finally produced polyarylene sulfide may have excellent properties. The polyarylene sulfide may have a melting point of 265 to 285° C.

In addition, the polyarylene sulfide having the above melting point may have melt viscosity of 300 to 4000 poise, as measured with a rotating disk viscometer at a temperature of melting point +20° C.

According to the present invention, minimum injection temperature may be lowered due to the melting point and melt viscosity properties.

Meanwhile, the term 'minimum injection temperature' refers to the lowest temperature at which polymer may be injection molded. In addition, as described in 'measurement method of minimum injection temperature' of experimental examples, it refers to the lowest temperature at which a screw is rotated in a reverse direction when resin is metered, and the molten resin may be filled in a barrel, and it is experimentally determined as a temperature at which continuous injection may be achieved.

In addition, the polyarylene sulfide according to the above embodiment is a product improved so as to have proper flowability in order to improve processability during molding of precision parts and minimize flash or burr generation, and it is a product capable of reducing outgassing during molding of a product because it may lower operation temperature due to the low melting point. Specifically, the polyarylene sulfide includes those wherein the length of an injection molded product, which is obtained by melting the polyarylene sulfide in an injection molding machine, and then, injection molding it in a spiral mold with a flow path radius of 3 mm and a flow path length of 150 cm, under maximum injection pressure of 1600 kgf/cm$^2$, injection filling amount of 20 ml, injection speed of 30 mm/s, injection holding pressure of 1550 kgf/cm$^2$, and minimum injection temperature, is 50 cm or less.

According to the present invention, due to the optimized flowability, during molding of computer accessories or electronic parts requiring accuracy, flash or burr is not generated, and thus, the present invention may be useful for molding of products requiring high molding accuracy.

According to another embodiment, there is provided a method for preparing the polyarylene sulfide according to the above embodiments, including (a) polymerization reacting reactants comprising diiodide aromatic compounds and sulfur compounds; and (b) additionally introducing 0.1 to 20 parts by weight of sulfur compounds, based on the 100 parts by weight of the sulfur compounds in the reactants, while progressing the polymerization reaction.

In the above preparation method, as a very small amount of sulfur compounds are additionally introduced during the reaction, disulfide bonds may be formed in the polymer. The disulfide bonds may continually cause a sulfur exchange reaction, which is an equilibrium reaction with polymer chains included in the polyarylene sulfide, and generally uniformalize the molecular weight of the polymer chains included in the polyaylene sulfide. Particularly, due to the equilibrium reaction of the sulfur exchange reaction, polymerization degree of the reactants may be generally uniformalized, and thus, formation of polyarylene sulfide polymer chains having too large or too small molecular weight may be inhibited.

Thereby, polyarylene sulfide having a specific weight ratio of the arylene sulfide repeat unit and the arylene disulfide repeat unit may be prepared.

In addition, the diiodide aromatic compounds may be used in the content of 1000 to 1400 parts by weight, based on 100 parts by weight of the sulfur compounds introduced before polymerization. If the content of the diiodide aromatic compounds is less than 1000 parts by weight, side reaction may be caused, and if it is greater than 1400 parts by weight, temperature inside the reactor may not be increased to desired temperature.

Preferably, the diiodide aromatic compounds may be included in the reactants in the content of 0.9 moles or more, based on the sulfur compounds.

Meanwhile, the time of introducing the sulfur compounds during the polymerization is not limited, as long as polymerization is progressed, but preferably, the sulfur compounds may be additionally introduced when polymerization is achieved 30 to 99%. If the sulfur compounds are introduced at this time, appropriate weight ratio of the arylene disulfide repeat unit may be included in the polyarylene sulfide. In addition, the addition of the sulfur compounds may be progressed only once during the polymerization, but it may be progressed more than once, namely in multi-stages, according to circumstances. In this case, the amount of total sulfur compounds added in multi-stages may be controlled in the range of 0.1 to 20 parts by weight based on 100 parts by weight of the sulfur compounds included in the initial reactants, but preferably, the sulfur compounds may be added in the content of 0.1 to 15 parts by weight, more preferably 1 to 13 parts by weight, most preferably 10 parts by weight, based on 100 parts by weight of the sulfur compounds included in the reactants. In addition, when the sulfur compounds are added in multi-stages, the number of times being added is not limited as long as the above content range is satisfied, but preferably, the sulfur compounds may be divided into more than once to four times, and added.

Meanwhile, in the step (a) of polymerization reacting reactants of diiodide aromatic compounds and sulfur compounds, a polymerization terminator may be additionally introduced. The content range of the polymerization initiator may be 1 to 20 parts by weight, based on 100 parts by weight of the sulfur compounds included in the reactants. If the content of the polymerization terminator is less than 1 part by weight, the effect obtained by adding the polymerization terminator may be insignificant, and if it is greater than 20 parts by weight, polyarylene sulfide having too low molecular weight may be prepared. Preferably, the polymerization terminator may be included in the content of 1 to 13 parts by weight, more preferably 1 to 10 parts by weight, based on 100 parts by weight of the sulfur compounds included in the reactants.

The polymerization terminator is not specifically limited as long as it may remove iodine groups included in the polymerized polymer to terminate polymerization, but it may be at least one preferably selected from the group consisting of diphenyl sulfide, diphenyl ether, biphenyl, benzophenone, dibenzothiazyl disulfide, monoiodoaryl compounds, benzothiazole, benzothiazolesulfenamide, thiuram, dithiocarbamate, and diphenyl disulfide. More preferably, it may be at least one selected from the group consisting of iodobiphenyl, iodophenol, iodoaniline, iodobenzophenone, 2-mercaptobenzothiazole, 2,2'-dithiobisbenzothiazole, N-cyclohexylbenzothiazole-2-sulfenamide, 2-morpholinothiobenzothiazole, N,N-dicyclohexylbenzothiazole-2-sulfenamide, tetramethylthiuram monosulfide, tetramethylthiuram disulfide, zinc dimethyldithiocarbamate, zinc diethyldithiocarbamate, dibenzothiazyl disulfide, and diphenyl disulfide.

Meanwhile, the diiodide aromatic compound that may be used in the polymerization reaction of the polyarylene sulfide may be at least one selected from the group consisting of diiodobenzene (DIB), diiodonaphthalene, diiodobiphenyl, diiodobisphenol, and diiodobenzophenone, but are not limited thereto, and diiodide aromatic compounds wherein an alkyl group or a sulfone group, and the like is additionally bonded as a substituent group, or heteroatom such as oxygen or nitrogen, and the like is contained in the aryl compound may be also used. The diiodide aromatic compounds may be in the form of various isomers according to the bonding position of iodine atoms, and compounds such as pDIB, 2,6-diiodonaphthalene, or p,p'-diiodobiphenyl, wherein iodines are symmetrically bonded at both ends at the farthest distance may be most preferable.

Furthermore, sulfur compounds that may be used are not limited. Commonly, sulfur exists as cyclooctasulfur (S8) at room temperature, but any commercially available solid state sulfur may also be used.

Meanwhile, the polymerization reaction may be progressed under conditions that may initiate a polymerization of reactants including diiodide aromatic compounds and sulfur compounds. Preferably, the polymerization may be progressed under temperature-increasing and pressure-reducing conditions, and in this case, the polymerization reaction may be progressed for 1 to 30 hours while increasing temperature and reducing pressure under the initial reaction conditions of temperature of 180 to 250° C. and the pressure of 50 to 450 torr to the final temperature of 270 to 350° C. and the final pressure of 0.001 to 20 torr.

Meanwhile, the method for preparing polyarylene sulfide according to the above explained embodiment may further include a step of melt mixing reactants including diiodide aromatic compounds, sulfur compounds before the polymerization reaction step. The above explained polymerization reaction is progressed as a melt polymerization that is progressed in the absence of an organic solvent, and to progress the melt polymerization, reactants including diiodide aromatic compounds may be previously melt mixed, and then, the polymerization reaction may be progressed. The melt mixing conditions are not limited as long as it may melt mix all the reactants, but preferably, the melt mixing may be progressed at a temperature of 130 to 200° C.

By conducting melt mixing before polymerization, melt polymerization may be more easily achieved.

Meanwhile, the polymerization reaction may be progressed in the presence of a nitrobenzene-based catalyst. In addition, if a melt mixing step is conducted before the polymerization reaction, the catalyst may be added in the melt mixing step. The nitrobenzene-based catalyst may include 1,3-diiodo-4-nitrobenzene, or 1-iodo-4-nitrobenzene, and the like, but is not limited thereto.

In addition, the polyarylene sulfide prepared by the above explained method includes an arylene sulfide repeat unit and an arylene disulfide repeat unit, wherein the weight ratio of the arylene sulfide repeat unit:arylene disulfide repeat unit is 1:0.0001 to 1:0.05.

The present invention also provides a product manufactured by molding the polyarylene sulfide, wherein the product may be in the form of a molded product, a film, a sheet or fiber. Particularly, in the case of a molded product, it may be a molded product of mobile phone connector, transistor part, DVD player part, sensor related part, and the like, requiring high molding accuracy.

The polyarylene sulfide of the present invention may be processed into various molded products by injection molding, extrusion molding, and the like. The molded product may include injection molded product, extrusion molded product, blow molded product, and the like. In the case of injection molding, mold temperature may be preferably 30° C. or more, more preferably 60° C. or more, still more preferably 80° C. or more in terms of crystallization, and it may be preferably 190° C. or less, more preferably 170° C. or less, still more preferably 160° C. or less in terms of modification of test piece.

Meanwhile, the polyarylene sulfide according to the above embodiments and the polyarylene sulfide polymerized according to the preparation method of the above explained embodiment may lower injection temperature, due to low melting point and relatively low melt viscosity property compared to the melting point. Specifically, according to the present invention, injection molding may be conducted even at a temperature below melting point +20° C., and thus, flowability may be appropriate even at injection temperature and flash or burr generation may be minimized. The present invention enables molding of precision parts, and enables operation even at low injection temperature, thus decreasing outgassing.

In addition, the products may be used as electric and electronic parts, construction element, automobile parts, machine parts or daily necessities, and the like. Also, the injection molded products may be compounded with fillers such as glass fiber or mineral filler, and the like, and then, molded. The content of the fillers is not limited, but to maintain excellent properties of polyarylene sulfide resin and simultaneously increase mechanical strength such as tensile strength, and the like, it may be included in the total compounding composition in the content of 10 to 70 wt %, preferably 30 to 65 wt %. Besides, commonly used additives such as lubricant or oxidation stabilizer, and the like may be included, and the kinds and contents are not limited.

If the molded product is provided as a film or a sheet, it may be made into various films or sheets including undrawn, uniaxially drawn, biaxially drawn film, sheet, and the like. If the molded product is fiber, it may be made into various fibers including undrawn, drawn, ultra-drawn fiber, and the like, which may be used as woven fabrics, knitting, non-woven fabrics (spun bond, melt blow, staple), rope, net, and the like.

The polyarylene sulfide of the present invention may exhibit excellent processability even at low temperature, decrease outgassing and flash or burr generation, and may be satisfactorily molded into a product requiring high molding accuracy, and thus, it may be usefully applied in the industrial field of preparing polyarylene sulfide and manufacturing a molded product using the same.

Hereinafter, the present invention will be explained referring to the following Examples and Comparative Examples, but the scope of the invention is not limited thereto.

Comparative Example

Polymerization of Polyarylene Sulfide

1. Polyarylene Sulfide of Comparative Example 1
0205P4 grade polyarylene sulfide (Ticona Company) was prepared. The polymer had melt viscosity (MV) of 700 poise, and melting point TM of 282° C.

2. Polyarylene Sulfide of Comparative Example 2
Polyarylene sulfide of Ryton P6 grade (Chevron Philips Company) was prepared, which is polymerized grade polyarylene sulfide polymerized by the same method as Comparative Example 1 except that MV is different. The polymer had MV 1100 poise, and Tm 281° C.

3. Polyarylene Sulfide of Comparative Example 3
Polyarylene sulfide of hb grade (Deyang Company) was prepared, which is polymerized grade polyarylene sulfide polymerized by the same method as Comparative Example 1 except that MV is different. The polymer had MV 2000 poise, and Tm 280° C.

Example

Polymerization of Polyarylene Sulfide

1. Polymerization of polyarylene sulfide of Example 1
Reactants including 4000 g of para diiodobenzene, 10 g of polymerization terminator (benzothiazyl disulfide), 340 g of sulfur and 5 g of a catalyst (1,3-diiodo-4-nitrobenzene) were melt mixed at 180° C. A polymerization reaction was progressed while increasing the temperature of the mixture from 180° C. to 300° C., and reducing the pressure from atmospheric pressure to 10 torr. 5 hours after the polymerization was initiated (when the polymerization was achieved 95%), 5 g of sulfur was additionally introduced, and polymerization was progressed for additional 3 hours to obtain polymer. The produced polymer had MV 700 Poise, Tm 280° C.

2. Polymerization of Polyarylene Sulfide of Example 2
Reactants including 4000 g of para diiodobenzene, 10 g of polymerization terminator (benzothiazyl disulfide), 340 g of sulfur and 10 g of a catalyst (1,3-diiodo-4-nitrobenzene) were melt mixed at 180° C. A polymerization reaction was progressed while increasing the temperature of the mixture from 180° C. to 300° C., and reducing the pressure from atmospheric pressure to 10 torr. 5 hours after the polymerization was initiated (when the polymerization was achieved 95%), 10 g of sulfur was additionally introduced, and polymerization was progressed for additional 3 hours to obtain polymer. The produced polymer had MV 1100 Poise, Tm 278° C.

3. Polymerization of Polyarylene Sulfide of Example 3
Reactants including 4000 g of para diiodobenzene, 10 g of polymerization terminator (benzothiazyl disulfide), 340 g of sulfur and 15 g of a catalyst (1,3-diiodo-4-nitrobenzene) were melt mixed at 180° C. A polymerization reaction was progressed while increasing the temperature of the mixture from 180° C. to 300° C., and reducing the pressure from atmospheric pressure to 10 torr. 5 hours after the polymerization was initiated (when the polymerization was achieved 95%), 15 g of sulfur was additionally introduced, and polymerization was progressed for additional 3 hours to obtain polymer. The produced polymer had MV 2000 Poise, Tm 275° C.

4. Polymerization of Polyarylene Sulfide of Example 4
Reactants including 4000 g of para diiodobenzene, 10 g of polymerization terminator (benzothiazyl disulfide), 350 g of sulfur and 15 g of a catalyst (1,3-diiodo-4-nitrobenzene) were melt mixed at 180° C. A polymerization reaction was progressed while increasing the temperature of the mixture from 180° C. to 300° C., and reducing the pressure from atmospheric pressure to 10 torr. 5 hours after the polymerization was initiated (when the polymerization was achieved 95%), 15 g of sulfur was additionally introduced, and polymerization was progressed for additional 3 hours to obtain polymer. The produced polymer had MV 2000 Poise, Tm 273° C.

5. Polymerization of Polyarylene Sulfide of Example 5
Reactants including 4000 g of para diiodobenzene, 10 g of polymerization terminator (benzothiazyl disulfide), 355 g of sulfur and 15 g of a catalyst (1,3-diiodo-4-nitrobenzene) were melt mixed at 180° C. A polymerization reaction was progressed while increasing the temperature of the mixture from 180° C. to 300° C., and reducing the pressure from atmospheric pressure to 10 torr. 5 hours after the polymerization was initiated (when the polymerization was achieved 95%), 15 g of sulfur was additionally introduced, and polymerization was progressed for additional 3 hours to obtain polymer. The produced polymer had MV 2000 Poise, Tm 270° C.

Meanwhile, manufacturing companies of Comparative Examples, and the reactants and the added amounts, and the amounts of sulfur compounds additionally introduced during the polymerization and the introduction time in Examples are summarized in the following Table 1.

TABLE 1

Preparation of polyarylene sulfide of Comparative Examples

| | |
|---|---|
| Comparative Example 1 | 0205P4 grade (Ticona Company) |
| Comparative Example 2 | Ryton P6 grade (Chevron Philips Company) |
| Comparative | hb grade (Deyang Company) |

TABLE 1-continued

Example 3

Preparation of polyarylene sulfide of Examples

|  | Reactants of Examples | | | Addition-ally introduced S (g) | Introduction time of additional S*** |
|---|---|---|---|---|---|
|  | pDIB (g) | S/ polymerization terminator (g) | catalyst* (g) | | |
| Example 1 | 4000 | 340/10 | 5 | 5 | 5 h |
| Example 2 | 4000 | 340/10 | 10 | 10 | 5 h |
| Example 3 | 4000 | 340/10 | 15 | 15 | 5 h |
| Example 4 | 4000 | 350/10 | 15 | 15 | 5 h |
| Example 5 | 4000 | 355/10 | 15 | 15 | 5 h |

(comment)
*As the catalyst, 1,3-diiodo-4-introbenzene is used.
**As the polymerization terminator, benzothiazyl disulfide is used.
***The introduction time of additional S refers to the time elapsed after the polymerization reaction is initiated.

6. Injection of the Polyarylene Sulfide of Comparative Examples 1 to 3

The polymers of Comparative Examples 1, 2, 3 were injected respectively at 305° C. and minimum injection temperature, and flowability, flash or burr generation, and outgas content of the injection molded product were evaluated.

7. Injection of the Polyarylene Sulfide of Examples 1 to 5

The polymers of Examples 1, 2, 3, 4, 5 were injected respectively at 305° C. and minimum injection temperature, and flowability, flash or burr generation, and outgas content of the injection molded product were evaluated.

Meanwhile, the flowability, flash or burr generation, and outgas content of the samples injected at 305° C. are shown in Table 2, and the flowability, flash or burr generation, and outgas content of the samples injected at minimum injection temperature are shown in Table 3. In addition, as mentioned above, the 'minimum injection temperature' refers to the lowest temperature at which polymer may be injection molded, and in general, it may be a temperature 20° C. higher than the melting point of the polymer. However, considering melt viscosity, and the like during injection molding in addition to melting point, if the melt viscosity of polymer is relatively low at a temperature of 20° C. higher than the melting point, minimum injection temperature may be a temperature below the melting point of melting point +20° C. Minimum injection temperature is determined by experimental value. Minimum injection temperature of each sample is shown in the following Table 3, and a method for measuring minimum injection temperature is as shown in the following Experimental Example.

Experimental Example

Measurement of Properties of Polyarylene Sulfide of Comparative Examples and Examples 1. Analysis of wt % of Disulfide A small amount (about 2 mg) of a sample was combusted at 1000° C. with AQF (Automatic Quick Furnace) to capture sulfuric acid with an absorption solution (hydrogen peroxide solution), which was then ionized. And then, sulfur ions were separated in a column with IC (Ion Chromatography), and the sulfur content was quantified with sulfur ion standard material (K2SO4). Difference between analyzed sulfur content and theoretical sulfur content was calculated as disulfide, and the results are shown in Table 3.

2. Analysis of Melt Viscosity

For the property analysis of the polymers synthesized according to Comparative Examples and Examples, melt viscosity was measured at Tm+20° C. with a rotating disk viscometer. To measure by Frequency sweep method, angular frequency was measured from 0.6 to 500 rad/s, and the viscosity at 1.0 rad/s was defined as melt viscosity. The measurement values are shown in Table 3.

3. Measurement of Melting Point (Tm)

Melting point was measured using Differential Scanning calorimeter (DSC) while increasing temperature from 30° C. to 320° C. at a speed of 10° C./min, cooling to 30° C., and then, increasing temperature again from 30° C. to 320° C. at a speed of 10° C./min. The measurement values are shown in Table 2.

4. Measurement of Flowability of Polymer (Spiral Test)

A spiral test commonly used to measure flowability of polymerized polymer was used. To progress the test, pellet type PPS was melt in an injection molding machine, and then, maximum injection pressure of 1600 kgf/cm$^2$, injection filling amount of 20 ml, injection speed of 30 mm/s, injection holding pressure of 1550 kgf/cm$^2$ were established, and injection temperature was changed to 305° C. (based on the barrel).

Meanwhile, the mold used in the flowability test (spiral test) includes spiral flow paths of half-cylinder shape like tunnel of road, wherein the radius of the flow path is 3 mm, the length of the flow path is 150 cm. After the polymer is injected from the middle part, the radius gradually increases, and as flowability is excellent, the polymer flows farther.

After the spiral test, the final length of the molded product separated from the spiral shaped mold was measured to measure the flowability of the polymer, and the measurement value is as shown in Table 2. In addition, at minimum injection temperature of each resin, spiral test was progressed while establishing remaining conditions same. The spiral test results of injecting at minimum injection temperature are as shown in Table 3. Meanwhile, minimum injection temperature of each sample is as described in the following '7. Measurement method of minimum injection temperature', and minimum injection temperature is appropriate injection temperature of each resin. In addition, the used injection molding machine is model name FN2000 manufactured by Nissei Company.

5. Measurement of Flash or Burr Formed During Manufacture of Molded Product

Using the polymers of Comparative Examples and Examples, except a main shape of the mold used in the spiral test at 305° C. and minimum injection temperature, a thin part between the front plate and the rear plate was cut, flash or burr generation amount was measured, and the results are described in the following Tables 2 and 3.

6. Measurement of Outgassing

To evaluate difference according to Examples and Comparative Examples, a certain amount (2 g) of the spiral injection molded sample was sealed in a 20 mL sealing vial, heated at 180° C. for 30 minutes with HS(Head Space) equipment, and then, generated gas was automatically transferred to GC/MS (Gas chromatography-Mass Spectrometer).

And then, each ingredient was separated with a capillary column and quantitatively analyzed, and the content of each ingredient in the sample was qualitatively analyzed using standard material (benzothiazole). As the sample, a molded product was used for measuring flash or burr, and the measurement results are shown in Tables 2 and 3.

7. Measurement Method of Minimum Injection Temperature

In general, minimum injection temperature may be around 20° C. of the melting point of PPS. However, considering melt viscosity at injection molding in addition to melting point, if melt viscosity is low at a temperature 20° C. higher than the melting point, minimum injection temperature may be established lower. In addition, the following experiment was repeated more than three times to determine minimum injection temperature of each sample. The measured lowest injection temperature of the resins of Comparative Examples and Examples are shown in Table 3.

Minimum injection temperature was experimentally determined as the lowest temperature at which screw is rotated in a reverse direction when resin is metered and molten resin may be filled in a barrel, and at this temperature, continuous injection should be achieved. For reference, if barrel temperature is too low and the resin is not sufficiently dissolved, metering or continuous injection may not be achieved.

TABLE 2

|  | M.V. (Poise) | Tm (° C.) | flowability (cm) | Flash or burr generation amount (g) | Outgassing amount (ppm) |
| --- | --- | --- | --- | --- | --- |
| Comparative Example 1 | 700 | 282 | 60 | 0.69 | 732 |
| Comparative Example 2 | 1100 | 281 | 57 | 0.42 | 901 |
| Comparative Example 3 | 2000 | 280 | 55 | 0.53 | 810 |
| Example 1 | 700 | 280 | 58 | 0.65 | 590 |
| Example 2 | 1100 | 278 | 51 | 0.51 | 510 |
| Example 3 | 2000 | 275 | 48 | 0.40 | 550 |
| Example 4 | 2000 | 273 | 54 | 0.46 | 680 |
| Example 5 | 2000 | 270 | 60 | 0.53 | 710 |

TABLE 3

|  | Disulfide weight (%) | Minimum injection temperature (° C.) | Flowability (cm) | Flash or burr generation amount (g) | Outgassing amount (ppm) |
| --- | --- | --- | --- | --- | --- |
| Comparative Example 1 | 0 | 300 | 58 | 0.65 | 620 |
| Comparative Example 2 | 0 | 300 | 55 | 0.38 | 810 |
| Comparative Example 3 | 0 | 300 | 53 | 0.48 | 700 |
| Example 1 | 0.4 | 295 | 50 | 0.34 | 400 |
| Example 2 | 0.7 | 293 | 45 | 0.23 | 310 |
| Example 3 | 1.0 | 290 | 45 | 0.1 | 240 |
| Example 4 | 1.5 | 286 | 45 | 0.1 | 180 |
| Example 5 | 2 | 285 | 45 | 0.1 | 120 |

As shown in the Table 2, it is confirmed that at the same injection temperature of 305° C., flowability and flash or burr generation amount is similar in Comparative Examples and Examples, but outgassing amount is smaller in Examples.

In addition, as shown in Table 3, it is confirmed that the polyarylene sulfide resin including a disulfide repeat unit of Examples may lower minimum injection temperature, and when products are molded at minimum injection temperature, excessive flowability may be decreased, and thus flash or burr generation may be decreased and outgassing may be much decreased compared to Comparative Examples.

What is claimed is:

1. Polyarylene sulfide comprising an arylene sulfide repeat unit and an arylene disulfide repeat unit, wherein the weight ratio of the arylene sulfide repeat unit:arylene disulfide repeat unit is 1:0.0001 to 1:0.05; wherein the degree of dispersion as defined by weight average molecular weight to number average molecular weight is 2.0 to 4.0, wherein polyarylene sulfide has a melt viscosity of 300 to 4000 poise, as measured by a rotating disk viscometer at a temperature of melting point +20° C.

2. Polyarylene sulfide according to claim 1, wherein the arylene sulfide repeat unit is included in the content of 95 to 99.99 wt %, based on the total weight of the polyarylene sulfide.

3. Polyarylene sulfide according to claim 1, wherein the arylene disulfide repeat unit is included in the content of 0.01 to 5 wt %, based on the total weight of the polyarylene sulfide.

4. Polyarylene sulfide according to claim 1, wherein the polyarylene sulfide has a number average molecular weight of 3,000 to 1,000,000.

5. Polyarylene sulfide according to claim 1, wherein the polyarylene sulfide has a melting point of 265 to 285° C.

6. Polyarylene sulfide according to claim 1, wherein the length of an injection molded product, which is obtained by melting the polyarylene sulfide in an injection molding machine, and then, injection molding it in a spiral mold with a flow path radius of 3 mm and a flow path length of 150 cm, under maximum injection pressure of 1600 kgf/cm$^2$, injection filling amount of 20 ml, injection speed of 30 mm/s, injection holding pressure of 1550 kgf/cm$^2$, and minimum injection temperature, is 50 cm or less.

7. A method for preparing the polyarylene sulfide of claim 1, comprising (a) polymerization reacting reactants comprising diiodide aromatic compounds and sulfur compounds; and (b) additionally introducing 0.1 to 20 parts by weight of sulfur compounds, based on the 100 parts by weight of the sulfur compounds in the reactants, while progressing the polymerization reaction.

8. The method for preparing polyarylene sulfide according to claim 7, wherein the sulfur compounds are additionally introduced when the polymerization is achieved 30 to 90% or more.

9. The method for preparing polyarylene sulfide according to claim 7, wherein the sulfur compounds are introduced more than once during the polymerization.

10. The method for preparing polyarylene sulfide according to claim 7, wherein the diiodide aromatic compounds in the reactants is included in the content of 0.9 moles or more, based on the sulfur compounds.

11. The method for preparing polyarylene sulfide according to claim 7, further comprising adding 1 to 20 parts by weight of a polymerization terminator, based on 100 parts by weight of the sulfur compounds in the reactants, in the (a) polymerization reaction step.

12. The method for preparing polyarylene sulfide according to claim 11, wherein the polymerization terminator is at least one selected from the group consisting of diphenyl sulfide, diphenyl ether, biphenyl, benzophenone, dibenzothiazole disulfide, monoiodoaryl compounds, benzothiazole, benzothiazolesulfenamide, thiuram, dithiocarbamate and diphenyl disulfide.

13. The method for preparing polyarylene sulfide according to claim 7, wherein the diiodie aromatic compound is at least one selected from the group consisting of diiodobenzene, diiodonaphthalene, diiodobiphenyl, diiodobisphenol, and diiodobenzophenone.

14. The method for preparing polyarylene sulfide according to claim 7, wherein polymerization reaction is conducted for 1 to 30 hours while increasing temperature and decreasing pressure under the initial reaction conditions of temperature of 180 to 250° C. and pressure of 50 to 450 torr to the final temperature of 270 to 350° C. and the final pressure of 0.001 to 20 torr.

15. The method for preparing polyarylene sulfide according to claim 7, further comprising melt mixing the reactants including the diiodide aromatic compounds and the sulfur compounds, before the polymerization reaction.

16. The method for preparing polyarylene sulfide according to claim 7, wherein the polymerization reaction is progressed in the presence of a nitrobenzene-based catalyst.

17. A product manufactured by molding the polyarylene sulfide according to claim 1.

18. The product according to claim 17, wherein the product is in the form of a molded product, a film, a sheet or fiber.

* * * * *